M. WEINRICH.
Treatment and Preparation of Saccharine Substances.
No. 234,511. Patented Nov. 16, 1880.
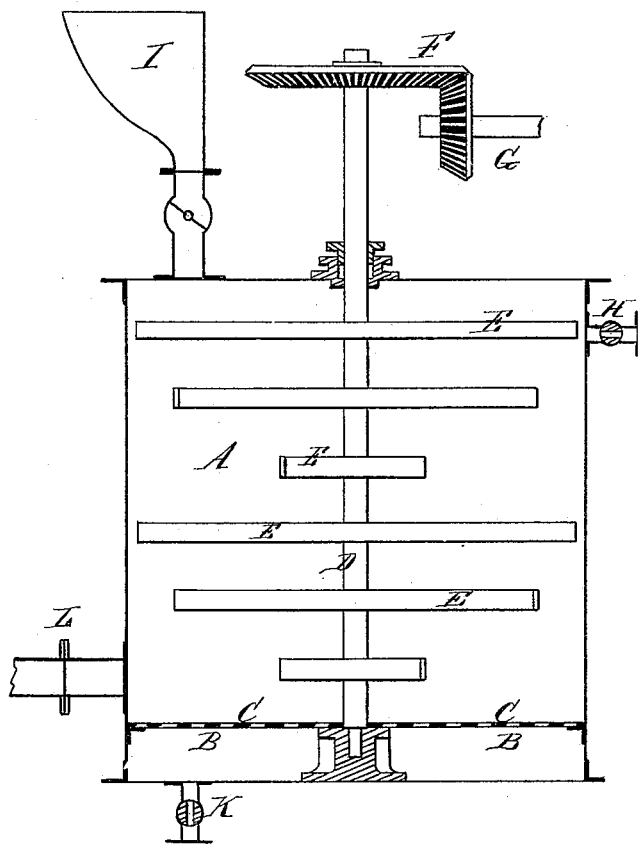

UNITED STATES PATENT OFFICE.

MORIZ WEINRICH, OF VIENNA, AUSTRIA.

TREATMENT AND PREPARATION OF SACCHARINE SUBSTANCES.

SPECIFICATION forming part of Letters Patent No. 234,511, dated November 16, 1880.

Application filed August 4, 1879. Patented in Austria and Hungary December 1, 1878, in Germany July 17, 1878, in France August 22, 1878, in Belgium August 14, 1878, in Italy March 31, 1879, and in England August 17, 1878.

*To all whom it may concern:*

Be it known that I, MORIZ WEINRICH, of Vienna, in the Empire of Austria, have invented a new and useful Process for the Treatment and Preparation of Saccharine Substances, (for which I have obtained Letters Patent in Austria and Hungary, dated December 1, 1878; in Germany, dated July 17, 1878; in France, dated August 22, 1878; in Belgium, dated August 14, 1878; in Italy, dated March 31, 1879, and in England, dated August 17, 1878;) and I do hereby declare that the following is a full, clear, and exact description thereof, enabling others skilled in the art to carry out my said invention.

My invention relates, generally, to processes for extracting the sugar from molasses, and it more especially relates to a process for producing what I call "sandy melassate of lime." This substance, which may be, and in fact now is, manufactured by my process as a marketable commodity, is composed principally of molasses, powdered slaked lime, and some impurities, and from it the sugar contained in the molasses, which forms a part of the sandy melassate of lime, may be extracted by subsequent operations, as is described in an application filed by me August 2, 1879.

To produce the substance which I call "sandy melassate of lime," I carry out the following process: I take the molasses to be treated, whether originally derived from cane or beet-root, and, after ascertaining the amount of saccharine substances contained in it, I mix with the molasses dry-slaked lime, (powdered hydrate of lime.) If the mass of molasses contains, say, one hundred pounds of sugar, I mix with this mass fifty pounds of the dry-slaked lime, calculated when in its anhydrous condition. If the lime is mixed with adulterating substances enough of the adulterated lime must be used to give fifty per cent. of the weight of the sugar contained in the molasses of pure lime. As it is difficult always to obtain an absolutely uniform mixture of molasses and lime, it is therefore advisable to use a little larger percentage of lime than is theoretically necessary—say about fifty-five per cent. of lime, by weight, of the sugar contained by the molasses. Of course my process is best carried out when pure lime of the kind referred to is used. The lime is mixed by stirring it in with the molasses (which is preferably heated up to about 150° or 200° Fahrenheit, or a little higher) in the most convenient vessels for carrying on such an operation. When the admixture is thoroughly effected the molasses, mixed with the lime, is poured out into any convenient vessels, in which the thick liquid may remain while cooling and until it becomes stiff. The vessels used are preferably small, preferably not more than one hundred gallons capacity, and it is better that they should be placed in a room slightly warmed above the ordinary temperature— say of about 80° Fahrenheit, or a little above. After the expiration of about twenty hours it will be found that the molasses and lime are no longer in a semi-liquid condition, but that the containing-vessels are filled with a dry mass, which can be easily removed from the vessels in which the cooling took place. I call this substance "melassate of lime," and it is a tri-basic sucrate of lime mixed with the impurities of the molasses, the proportions of lime and sugar used having been such as to to form the tri-basic sucrate.

The melassate of lime when removed from the cooling-vessels is broken up into small pieces of about half the size of a man's thumb. However, the pieces may be much smaller—as, for example, like very fine shot. This pulverizing operation can be readily carried out, as the material is easily broken, and if large quantities are to be operated upon it can best be done by using percussion-mills, such as are described in the English patent to Carr or the American patent to Van Buren Ryerson. The melassate of lime should not be powdered to the condition of flour; but if it should be finely divided its subsequent use must be accompanied by an admixture of gravel, or not so finely-pulverized material, the word "gravel" being used to express the broken melassate of lime when pulverized to the proper degree. The pulverized melassate of lime is now ready for further treatment, and this is best effected in a closed vessel having stirring-arms, the construction of which I shall describe farther on. The vessel having stirring-arms is partly filled with alcohol of about seventy per cent. purity, and in this alcohol the pulverized melassate of lime is placed. The arms are set in motion, and the mass, now in a semi-liquid condition, is thoroughly mixed. After a few minutes of this stirring operation the mass will be in the desired condition, and will have become sandy or granular, and for that reason I call it "sandy melassate of lime."

The time occupied by the alcohol treatment for the purpose of producing sandy melassate of lime from the melassate of lime introduced into the stirring-vessel will vary. It depends, first, on the size of the particles of melassate of lime, and, second, on their hardness. Particles of melassate of lime measuring about one-tenth of an inch in diameter and of usual hardness will require a little less than eight minutes for their complete penetration by the alcohol. If larger more time will be required, and if smaller less time.

The hardness of the particles of melassate of lime depends somewhat upon the temperature of the molasses when mixed with the lime at the commencement of the operation. The hotter the molasses the harder will be the melassate of lime resulting from the mixture and the greater the length of time required to form the sandy melassate of lime. I consider that the best results are to be arrived at by always using the highest temperature (substantially within the limits heretofore given) for the molasses when it is to be mixed with the lime, as previously described. When in this condition it can be readily subjected to further treatment for the removal of its impurities, and can subsequently have the contained sugar extracted, all of which operations are fully described in another specification forming part of an application filed by me August 2, 1879.

I will now describe the preferred form of mixing-tank in which I treat the melassate of lime for the purpose of producing the sandy melassate of lime. The drawing shows a vertical section of this apparatus.

A is a tank closed, with the exception of the openings to be described. It is provided with a perforated false bottom, B, which is preferably made of wire-netting or the like. Upon the upper side of this division B rests a thickness of linen or canvas cloth, C.

The vertical shaft D has attached to it mixing-arms E E, and this shaft is caused to revolve by the gears F G, the latter being driven by power.

H is the cock or opening through which alcohol is introduced for forming the sandy melassate of lime. The melassate of lime is introduced through the opening I, which is preferably funnel-shaped.

The cock K at the bottom of the vessel serves to draw off the alcohol after it has completed its work upon the melassate of lime in the tank A.

The opening at L is used to remove the treated mass from the tank, and should be provided, as should be all the other openings, with the proper closing mechanism.

The mixing-tank may be of any size found most convenient. Following the proportions of the annexed drawing, the tank might measure from the perforated bottom to the cover or top, say, ten feet.

The alcohol, after becoming impure, should be refined and reused. Under the term of "alcohol" I include methyl-alcohol, as well as ordinary alcohol.

It will be observed that no high degree of heat is used in any part of my process, and that likewise no heat injurious to the materials is developed by chemical action of the substances upon one another, and this I consider as important.

Although in the beginning of this specification I advise that a slightly greater quantity of lime be used than fifty per cent. of the weight of the sugar contained in the molasses, I do not intend to imply that an excess of lime should be used, or more than is necessary to produce the desired result, the above proportions being about right, and any further addition of lime would be wasteful and deleterious, the slight excess referred to being merely mentioned as necessary for the purpose of obviating the errors incident to mixtures not made with absolute accuracy.

It will be seen that by my process I obtain, without any artificial drying, first the melassate of lime in a thick dry homogeneous mass, which may readily be broken up or pulverized preparatory to mixing with alcohol, to produce the sandy melassate of lime in the granular homogeneous mass.

Both my process and the product thereof differ from previously-known processes and their products, which processes, like my invention, were founded on knowledge of the facts that when molasses and lime are mixed in proper quantities the sugar contained in the molasses will unite with the lime and form tri-basic sucrate of lime, and that this product is insoluble in alcohol, while a large portion of the non-saccharine matter contained by the melassate of lime can be dissolved by alcohol. The prior methods alluded to of which I have knowledge were: First, that in which cold molasses was mixed with lime-water to obtain a plastic melassate of lime, which had to be subjected to an artificial drying before further treatment. Second, that in which cold molasses was mixed with caustic or unslaked powdered lime, bringing about a strong chemical reaction and rapid raising of the temperature, and producing a porous dry melassate of lime, together, however, with some non-saccharine combinations not separable either by alcohol or by other of the well-known purifying methods, and greatly diminishing the crystallizing capacity of the sugar. Third, that in which semi-caustic or partly-slaked lime is mixed with cold molasses. This method, however, is also objectionable on account of the heat generated by the action of the caustic lime, which injures the material and impairs the quality of the product. Fourth, the process in which molasses thickened and in a cold state was mixed with an excess of lime in a dry slaked state, more lime being used than was required for chemical combination. There was, however, produced by this treatment a granulated mass; but in consequence of the large quantity of lime, coupled with the incomplete mixing, a very unequal melassate of lime was produced, the imperfections in which substance were noticeable while being washed, the result of which was that a considerable amount of sugar was lost, and a correspondingly smaller yield of pure sugar was obtained.

What I claim as new, and desire to secure by Letters Patent, is—

1. The process herein described of producing sandy melassate of lime, which consists in first mixing together warmed molasses and dry powdered hydrate of lime, then pulverizing the dried product of this mixture, and finally mixing the pulverized mass with alcohol, all these steps being carried out substantially as and in the order set forth.

2. As a new article of manufacture, sandy melassate of lime, formed from a mixture of warm molasses and dry powdered hydrate of lime, and consisting of lime, sugar, and removable impurities in a granular homogeneous state, substantially as described.

MORIZ WEINRICH.

Witnesses:
DR. ED. SCHMIDT, C. E.,
CARL HAHN.